April 7, 1953
A. JARMANN, JR
2,633,710
VARIABLE RATIO FLUID TRANSMISSION OF
THE RECIPROCATING PISTON TYPE
Filed Aug. 1, 1947
3 Sheets-Sheet 3
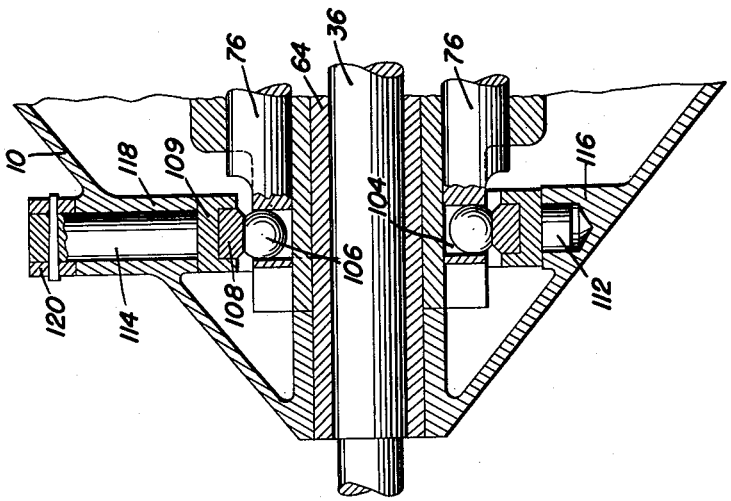
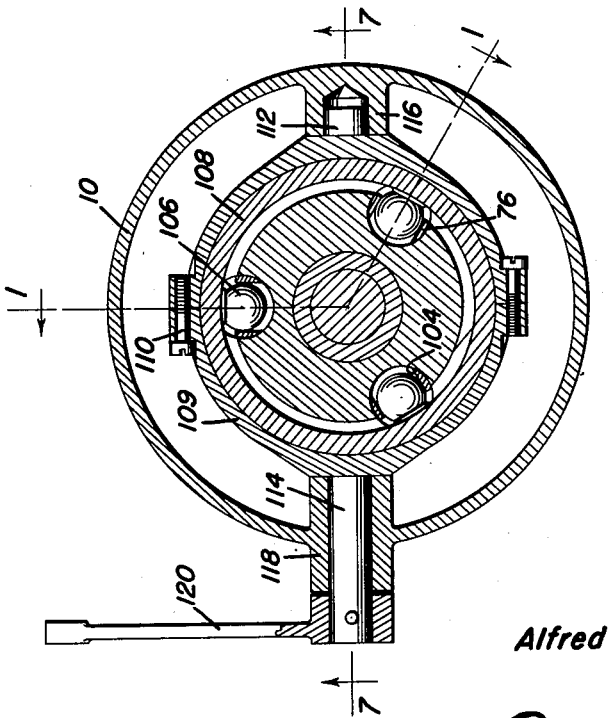
Inventor
Alfred Jarmann, Jr.
By Clarence A. O'Brien
and Harvey B. Jacobson
Attorneys

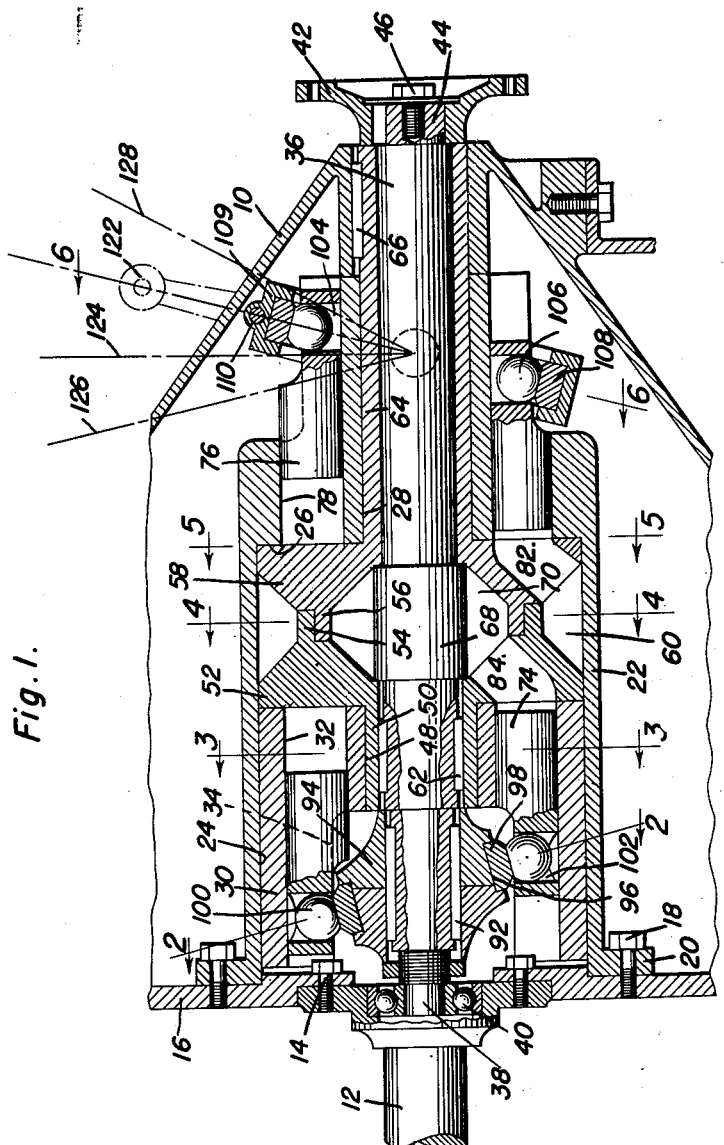

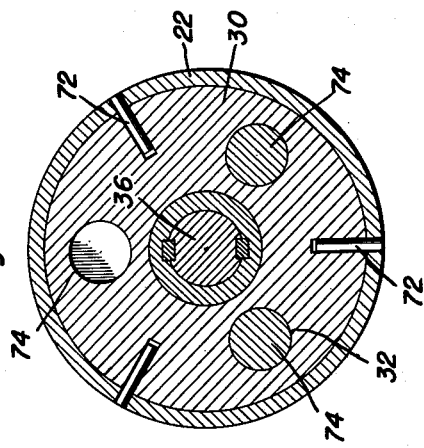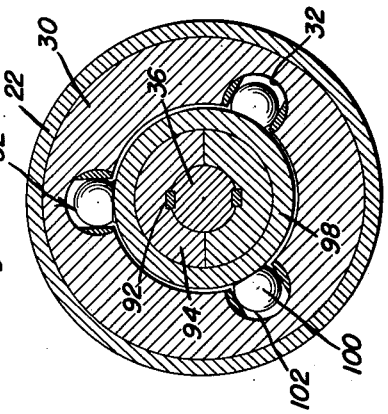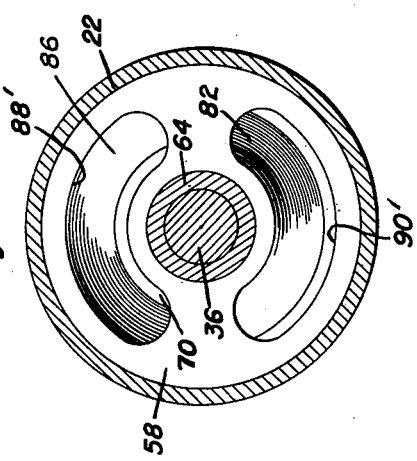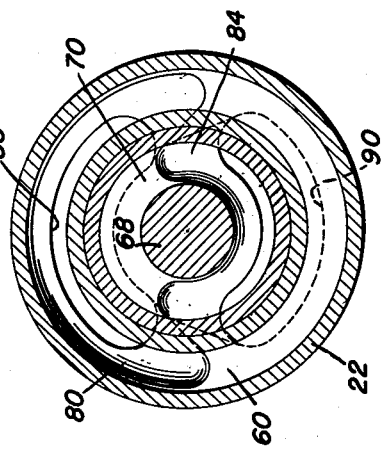

Patented Apr. 7, 1953                                                    2,633,710

UNITED STATES PATENT OFFICE 2,633,710

VARIABLE RATIO FLUID TRANSMISSION OF
THE RECIPROCATING PISTON TYPE

Alfred Jarmann, Jr., Schodack Landing, N. Y.

Application August 1, 1947, Serial No. 765,294

1 Claim. (Cl. 60—53)

This invention comprises novel and useful improvements in a variable fluid transmission and more specifically pertains to a hydraulic transmission mechanism for transmitting rotary motion between a driving and driven member at predetermined and variable speed ratios.

It is a primary purpose of this invention to provide a variable fluid transmission which will be positive in operation, eliminating slippage and lost motion.

A further purpose of the invention is to provide a transmission in conformity with the foregoing objects which shall be variable as to the speed ratio as well as to the torque transmitted thereby.

Another object of the invention is to provide a mechanism in accordance with the foregoing objects which shall be capable of operating selectively in both forward and reverse directions, without changing the direction of rotation of the driving member.

Yet another object of the invention is to provide a transmission in accordance with the preceding objects which may be operated as an over-drive, indirect drive, in reverse and in variable speed ratios within these ranges.

Yet another intention of the invention is to provide a hydraulic transmission as set forth in the above mentioned objects which shall be equally applicable as a brake when employed in a vehicle or similar mechanism.

An additional purpose of the invention is to provide an appliance as set forth in the above objects which shall be capable of control by a single adjusting lever for all of the above mentioned modes of operation.

Still another purpose of the invention is to provide a transmission which is variable in conformity with the above mentioned objects and which shall have a simplified control means rendering it adaptable for automatic operation and yet shall provide a positive connection between motor and drive shaft in all operating positions assuring a perfect control over the motor vehicle or other mechanism with which the invention is associated, at all times.

And a very important intention of the invention is to provide a hydraulic transmission as characterized in the preceding objects which shall have in the direct drive position, with the drive shaft of the transmission a direct connection from the driving to the driven member through the medium of compressed oil, whereby there shall be no moving parts of the transmission itself except its bearings.

And a final purpose of the invention to be specifically enumerated herein resides in providing a transmission of the characteristics above enumerated which shall be compactly held in a unitary casing, of relatively few parts and yet capable of a wide range of adjustment, which shall be durable and dependable in its operation and withal of inexpensive construction.

These, together with various anciliary objects of the invention which will later become apparent as the following description proceeds, are attained by this device, a preferred embodiment of which has been illustrated, by way of example only, in the accompanying drawings, wherein:

Figure 1 is a fragmentary longitudinal sectional view showing the improved transmission in accordance with this invention connected to a driving and driven member and is taken substantially upon the plane of the broken section line I—I of Figure 6;

Figure 2 is a vertical transverse sectional view through the piston connecting means of the driving portion of the mechanism and is taken substantially upon the plane of the section line 2—2 of Figure 1;

Figure 3 is a vertical transverse sectional view through the driving cylinders of the mechanism and is taken substantially upon the plane of the section line 3—3 of Figure 1;

Figure 4 is a vertical transverse sectional view through the valve mechanism of the invention and is rotated substantially 90° from a view taken substantially upon the plane of the section line 4—4 of Figure 1;

Figure 5 is a view in vertical transverse section through the driven cylinder of the invention and rotated substantially 90° from a view taken substantially upon the plane of the section line 5—5 of Figure 1;

Figure 6 is a vertical transverse sectional view taken through the adjusting means for varying the capacity of the driven member of the transmission and is taken substantially upon the plane of the section line 6—6 of Figure 1; and, Figure 7 is a horizontal sectional elevation of a portion of the invention taken substantially upon the plane of the section line 7—7 of Figure 6.

Referring now more specifically to the accompanying drawings, wherein like numerals designate similar parts throughout the various views, attention is directed first to Figure 1, wherein the invention is applied to any suitable mechanism for converting motion from a driving member to a driven member, such as the transmission mechanism of an automotive vehicle, although the invention is obviously applicable to any other environment employing a power transmitting means.

In accordance with the invention, the transmission casing, a portion of which is shown at 10, is suitably mounted in any desired manner upon a supporting framework such as the chassis of a motor vehicle, not shown, and in this environment or use is suitably secured to the casing of the engine, not shown. The power is applied from a driving shaft 12 which may constitute a portion of the crank shaft of an engine, and to which is secured as by fastening bolts 14, a portion of a flywheel 16. Secured detachably to this latter element as by bolts 18, is the flanged extremity 20 of a generally hollow cylindrical housing 22 which is closed at its other end and is rotatable with the flywheel 16.

At its open end, that is, the end portion bolted to the flywheel, the housing 22 is provided with a cylindrical bore or chamber 24 which terminates in a shouder or bottom wall 26.

Extending through the closed end of the cylindrical casing 22 and axially aligned with the bore 24, is a second bore 28 for a purpose to be later set forth. Detachably and rigidly secured in the bore 24, is an annular or cylindrical block 30 which is provided with a plurality of parallel bores 32 forming cylinders in the operating unit of the transmission as will be set forth hereinafter, these cylinders being parallel to each other and equidistantly spaced about the axis of the block 30 and bore 24, and are provided upon the adjacent and inner portions with cut-away portions 34 for a purpose to be later set forth.

A drive shaft 36 is disposed axially in the bores 24 and 28, and at its inner extremity is provided with a reduced portion 38 which is journalled in anti-friction bearings 40 in the end of the crank shaft 12, while at its outer end, the shaft 36 has detachably secured thereto a driving flange by which a connection may be made with any suitable driven shaft, this flange being indicated at 42 and secured upon the reduced extremity 44 of the shaft 36 as by a fastening bolt 46.

An axial bore 48 is provided in the block 30, and the sleeve-like extremity 50 of an annular valve member 52 is journalled therein. This valve member is provided with an annular rib 54 having sliding and sealing engagement with a corresponding rib 56 carried by the complementary valve member 58, these two valve members being seated between the above mentioned shoulder 26 and the inner extremity of the block 30, whereby the valve is firmly but rotatably seated in the housing 22.

The two complementary sections of the valve member are provided with an annular outer channel 60 upon the outer periphery of the valve members, for a purpose to be later set forth. By means of keys or splines 62, the valve section 52 is secured by its sleeve 50 in fixed and rigid position upon the shaft 36, while the other valve section 58 is provided with a rearwardly extending annular sleeve portion 64 which is journalled upon the shaft 36 and is fixedly secured as by keys or splines 66 to the stationary casing 10. Thus, the valve section 58 is rigidly secured to the stationary casing 10, while the valve section 52 is keyed to the shaft 36, for selective rotation therewith as set forth hereinafter.

The shaft 36 intermediate its ends and within the confines of the valve sections 52 and 58, is provided with an enlarged portion 68 and an annular chamber 70 is defined between this enlarged portion and the inner surfaces of the valve sections 52 and 58. As shown best in Figure 3, the block 30 is secured in the bore 24 of the housing 22 by means of a plurality of pins 72 detachably fastening these parts together; although as will be readily appreciated the block 30 may in some instances be integrally formed with the housing 22.

Reciprocable in each of the cylinders 32, is an operating piston 74 while similar pistons 76 are slidable within the cylinder 78 of the operated portion of the transmission.

Referring now more specifically to Figures 1, 4 and 5, it will be seen that the annular chamber 60 is provided with arcuately extending ports 80 and 82 communicating respectively with the operating and the operated unit cylinders. Similarly, the inner chamber 70 of the valve member is connected by arcuate ports 84 and 86 with the chambers of the operating and operated units. These ports are substantially semi-circular where they communicate with the valve chambers, but are of such arcuate extent where they communicate with the cylinders that but one cylinder of each unit can establish communication therewith at a time. Thus, as relative rotation of the valves and cylinders occurs, each cylinder is successively placed in communication with one or the other of the channels 60 and 70, while a corresponding cylinder of the other unit is likewise and simultaneously in registry therewith.

Referring now to Figures 1 and 2, it will be seen that the outer extremity of the shaft 36 is provided with splines or keys 92 by means of which is fixedly secured a wobbler plate 94 which if desired may be more conveniently formed of a pair of sections as indicated, and which is pressed against a suitable shouldered portion of the shaft and retained thereon as by a threaded fastening nut. The wobbler plate is provided with a cylindrical surface upon its periphery which is inclined relative to the axis of the shaft 36, and which is provided with an annular groove or channel 96 within which is rotatably seated an annular ring 98 having integral radially extending ball portions 100 thereon.

As shown, these ball members are integrally formed upon the ring 98, but if desired may be rigidly but detachably secured thereto in any suitable manner. Pivotally and slidably received upon the balls 100 are seat portions 102 consisting of sockets formed in the inner extremities of the pistons 74, and by means of which the pistons are reciprocated in response to rotation of the ring 98 and vice versa. The cut-away portions 34, of the cylinders 32 obviously provide clearance for the relative angular movement and positioning of the wobbler plate 94 during relative rotation of wobbler and cylinders.

Referring now more specifically to Figures 1, 6 and 7, it will be seen that the pistons 76 of the driven unit of the transmission are likewise provided at their outer extremities with seats or sockets 104 for swivelly and pivotally receiving ball members 106 rigidly or integrally carried by the inner surface of a ring 108 which is rotatably received in a channel of a control yoke 109 forming a swash plate which if desired may for convenience by formed of two semi-circular halves detachably secured as by bolts 110. The control yoke is provided with trunnions 112 and 114 journalled in bosses 116 and 118 in the sides of the stationary casing 10 at diametrically opposite sides thereof relative to the longitudinal axis of the shaft 36. The trunnion 114 extends externally of the casing 10 and has a lever 120 secured thereto which constitutes an operating means for varying the inclination of the yoke relative to the axis of the shaft in a manner well-known in the art. As shown in Figure 1, the lever having an eye portion 122 engageable by any suitable operating means, not shown, whether manual or automatic, is adjustable to a plurality of positions by means of which the inclination of the yoke may be varied and the position of the pistons 76 in the cylinders 78 may be adjusted. When the lever is in the position indicated at 122 in Figure 1, the control yoke of the swash plate is at the same inclination relative to the shaft 36 as that of the wobbler plate 94, and since the bores of the cylinders 32 and 78 and the diameters of the pistons 74 and 76 are all equal, it will be evident that the pistons 74 and 76 thus have the same displacement in their cylinders. When moved to the position 124, the control yoke is disposed perpendicular to the longitudinal axis of the shaft 36, whereby each of the pistons 76 is at the same position in the cylinder bores, and consequently there is no relative movement of these pistons in their bores. Thus, when in this position, the transmission is in direct drive between the driving crank shaft 12 and the driven shaft attached to the coupling 42, with no movement of the transmission parts other than the movement of the shaft 36 with its bearings. When moved to the position indicated at 126, the transmission is in its over-drive position which is the high speed ratio normally employed for the predominant use of the device. Finally, the control yoke may be moved to the extreme position indicated at 128, whereupon the shaft connected to the coupling 42 is driven in a reverse direction compared to the rotation of the driving shaft 12.

Obviously, variations of speed ratios between the positions 126 and 124, 124 and 122, and 122 to 128, are possible thus giving flexible operation to the transmission without the necessity of employing gears. The operation of the mechanism is as follows, it being understood that the crank shaft 12 throughout all positions of adjustment of the transmission is rotating constantly in one direction, carrying with it the flywheel 16, the housing 22 and the block unit 30 therein, and the pistons 74 together with the ring 98.

In the neutral position, as shown at 122 in Figure 1, the rotation of the block 30 causes the rotation of the ring 98 without the wobbler plate 94, thereby reciprocating the pistons 74. During part of their revolution, each piston 74 of the driving unit pumps fluid into the outer chamber 60 of the valve, and withdraws fluid from the inner chamber 70 thereof. Simultaneously, the rotation of the piston 76, cylinder 78 and ring 108 of the driven unit cause an identical but opposite reciprocation of the piston 76 in the cylinder 78. Since as above pointed out the displacement of pistons 74 and 76 is identical in this position, the driven unit during each revolution of the pistons thereof withdraws fluid from the outer chamber 60 and delivers fluid to the inner chamber 70 of the valve member. Thus, the fluid delivered by each piston from the driving unit is exactly absorbed by the intake of a corresponding piston of the driven unit whereby no pressure is generated or created and maintained in the chambers 60 and 70 or in the cylinder bores 32 and 78. Thus, there is no tendency to rotate the shaft 36, and therefore although the crank shaft 12 rotates there is no torque transmitted to the coupling 42 for rotating the driven shaft.

When now the control lever is put in the position shown at 124, there is no displacement of the pistons 76 despite the rotation of the housing 22 and of the pistons 76, since the pistons 76 and their connecting ring 108 slide freely in the control yoke. Consequently, the fluid delivered by the pistons 74 establishes a pressure which cannot escape through the valve member and creates a torque upon the wobbler plate 94 which rotates the shaft 36. Thus, the shaft 36 is compelled to rotate at the same speed as the crank shaft 12, the housing 22 and the pistons 74 thereby establishing a direct drive between crank shaft 12 and the driven shaft secured to the coupling member 42.

Obviously, in positions between those shown at 122 and 124, some of the fluid delivered by the piston 74 can now be displaced into the cylinder 78 in view of the adjusted reciprocation of pistons 76 by varying the inclination of the control yoke beyond the neutral position. In proportion to this displacement, the wobbler plate 94 and shaft 36 are rotated at various speeds relative to the crank shaft 12, thereby establishing variable speed ratios between the crank shaft 12 and the driven shaft.

In the over-drive position indicated at 126, the inclination of the control yoke and positions of the pistons 76 are such with respect to the driving unit pistons that the shaft 36 and the driven shaft attached to the coupling member 42 is caused to rotate at a speed greater than that of the crank shaft 12.

In the reverse position indicated at 128, the displacement of the driving and driven units is so timed as to cause the shaft 36 to rotate in the opposite direction throughout a predetermined speed range in between the positions 122 and 128 as desired.

From the foregoing the manner of constructing and utilizing the device will be readily understood and further explanation is believed to be unnecessary.

Since numerous modifications will readily occur to those skilled in the art after a consideration of the foregoing specification and accompanying drawings, it is not intended to limit the invention to the exact construction shown and described, but all suitable modifications and equivalents may be resorted to falling within the scope of the appended claim.

What is claimed as new is as follows:

A variable transmission comprising a support, a fly-wheel, a drive shaft non-rotatably attached to said fly-wheel, a cylindrical housing having one end thereof secured to said fly-wheel axially of said drive shaft, an end wall on the other end of said housing having a first set of circumferentially spaced cylinders therein, a driven shaft rotatably journaled in said fly-wheel and extending through said end wall, an annular cylinder block having a second set of circumferentially spaced cylinders therein non-rotatably mounted within said housing adjacent said fly-wheel, first and second relatively rotatable valves rotatably mounted in said housing between said end wall and said cylinder block selectively communicating the cylinders of the first set to the cylinders of the second set, pistons in said cylinders, a wobbler plate carried by said driven shaft operatively engaging the pistons in said second set of cylinders, a swash plate movably mounted on said support and operatively engaging said pistons in said first set of cylinders, each of said valve members including an annular outer bearing surface rotatably engaging the inner surface of said housing, the outer bearing surface of said first and second valves respectively abutting said end wall and the registering face of said cylinder block, an inner bearing surface on each of said valves disposed radially inwardly from said outer bearing surfaces, said inner bearing surfaces contacting each other, said inner bearing surfaces and said housing defining an outer valve chamber, said inner bearing surfaces and said driven shaft defining an inner valve chamber, parts in each of said valves selectively each communicating one of the adjacent cylinders with said outer chamber and a second adjacent cylinder with said inner chamber.

ALFRED JARMANN, JR.

REFERENCES CITED

The following references are of record in the file of this patent:

UNITED STATES PATENTS

| Number | Name | Date |
|---|---|---|
| 2,141,166 | Bischof | Dec. 27, 1938 |
| 2,151,415 | Bennetch | Mar. 21, 1939 |
| 2,486,690 | Tipton | Nov. 1, 1949 |

FOREIGN PATENTS

| Number | Country | Date |
|---|---|---|
| 10,108 | Great Britain | Apr. 28, 1909 |
| 508,434 | France | July 24, 1920 |